May 4, 1943.    J. A. LINDE    2,318,001
ORTHODONTIC APPLIANCE DEVICE
Filed July 30, 1941
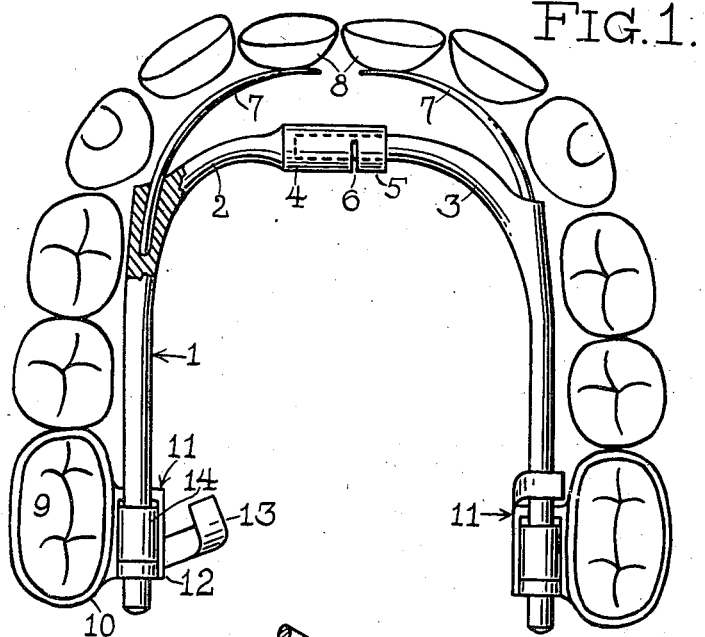
FIG. 1.
FIG. 3.
FIG. 4.
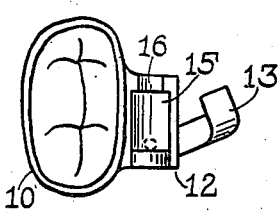
FIG. 2.
FIG. 11.
FIG. 5.
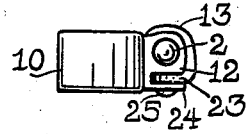
FIG. 6.
FIG. 7.
FIG. 8.
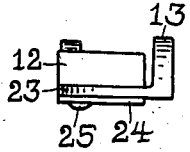 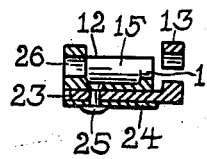
FIG. 9.
FIG. 10.
John A. Linde INVENTOR:
BY C. F. Wm. Forssberg
ATTORNEY.

Patented May 4, 1943

2,318,001

UNITED STATES PATENT OFFICE 2,318,001

ORTHODONTIC APPLIANCE DEVICE

John A. Linde, Brooklyn, N. Y.

Application July 30, 1941, Serial No. 404,667

7 Claims. (Cl. 32—14)

This invention relates to orthodontic appliance devices including certain novel features of orthodontic appliance arches and means for adjusting the same.

The main object of my invention is to produce greatly improved orthodontic appliances, arches, locks, etc., and the means for adjustably separating or closing together two corresponding arch members.

Another object is to facilitate production of orthodontic appliances and their apurtenances and increasing their effectiveness by improvements in their structure and design.

Further objects and the various advantages inherent in my invention and its application in actual practice will appear more fully in detail as this specification proceeds.

In order to elaborate the forms and details of the invention more comprehensively the same is illustrated by way of non-limiting examples in the accompanying drawing forming part hereof.

Hence, Fig. 1 is a plan view of an appliance of the character indicated with adjustable devices and locks according to certain important features of my invention.

Fig. 2 illustrates a tooth anchoring band and part of a lock secured thereto as released from the appliance of Fig. 1.

Fig. 3 illustrates an enlarged fragment of the appliance arch of Fig. 1 which corresponds to and is adapted to cooperate with the lock portion of Fig. 2.

Fig. 4 is a transverse section of the part shown in Fig. 3.

Fig. 5 is a similar view of a modification.

Fig. 6 is a rear end elevation of the lock and band shown at the left portion of Fig. 1, in assembled condition.

Fig. 7 is another view of the same as seen from the other end with the arch in section.

Fig. 8 is a similar view of the lock and band with the lock shown open and the arch wire removed.

Fig. 9 is a side elevation of the lock of Figs. 2 and 6.

Fig. 10 is a longitudinal section of the lock of Fig. 9.

Fig. 11 is an enlarged fragmentary view of the upper portion of the appliance arch alone of Fig. 1, showing the parts separated.

Throughout the views the same reference numerals indicate the same or corresponding parts.

In most extensive orthodontic procedures for correcting malocclusion and individual displacements of teeth, an arch appliance is used upon which are attached various members or appliances and devices are mounted, such as anchoring bands, springs, hooks, etc. Such appliance devices and arches are susceptible of considerable improvement to facilitate manufacturing and also insertion in a patient's mouth as well as adjustments thereof for various purposes.

Hence, in the practice of my invention, an appliance arch, generally indicated at 1 consists of two corresponding arch members 2 and 3, the end of member 3 being adapted to be inserted into a long sleeve 4 on member 2, the aperture or bore in said sleeve at 5' being a loose fit except at the outer end where the end portion 5 is partly separated from the main portion of the sleeve by a slot or cut 6 and said end 5 then also split by a second longitudinal cut 6'. This frees the split portion to grip the end of the arch member 3 with any desired degree of friction, so that when the two arch members are assembled, they will normally remain adjusted apart or together until readjusted by actual application of force to further separate them or bring them together even more closely than when first assembled. This adjustment is very convenient to follow up progressive movements of teeth caused by the appliance as a whole, so that the same appliance may be used throughout the treatment of a case.

In many cases, certain front or side teeth must be shifted by springs as shown at 7, 7 which bear against the teeth 8, and these springs are now made in a very speedy and satisfactory manner as will presently be described.

However, the arch 1 requires to be anchored in order to be effective, which is a well known fact, and for this purpose bands 10 are anchored to the molars 9 and locks indicated generally at 11, 11 are secured to said bands by soldering, brazing or welding. The main body 12 of the lock has a longitudinal cavity 15 and a semicircular seat 16 at the forward end thereof upon which the arch wire or member 2 or 3 may rest, and at the rear end the lock has an aperture 26 through which said arch wire may extend when assembled with the lock. Upon the arch member is preferably mounted a sleeve 14 which is eccentric and split at 17 so that it may be a hard frictional fit on the arch wire, and only moved along said wire by application of considerable force. This sleeve is intended to seat in the recess or cavity 15 of the lock body and is eccentric in order to bring the arch wire as close to the side of the tooth 9 as possible, the fact that it is split making it possible to shift the sleeve, as it is thus virtually a spring surrounding the arch wire. A modification of the sleeve is shown at 20 in Fig. 5, in which said sleeve is quite round but has a split side flattened or cut away at 21 and split at 22, the result being substantially the same as in the case of sleeve 14, although it is somewhat less yielding.

At the lower part of the lock body is a lug 24 parallel with and secured to the bottom of said lock, the space between serving to receive a pivoted lug 23 of a locking member 13 which is retained in assembled relation with the lock body by means of a pin, screw or rivet 25 which passes up through said lug 24, lug 23 and up into the bottom of the lock body 12. The upper portion of locking member 13 is hooked so as to be capable of being swung over the arch wire 2 as shown in Figs. 6 and 7, when the same bears on said arch wire and prevents removal of the same and the sleeve from recess 15. If the arch wire is to be removed, it is but necessary to swing out locking member 13 into the position indicated in Figs. 2 and 8, and it will be possible to lift the arch wire clear from the lock while withdrawing the end thereof from the end aperture 26 of the lock as seen in Fig. 8, and in section in Fig. 10.

It is obvious that at first, the sleeve 14 or sleeve 20 may not occupy the exact place upon either arch wire, and it may therefore be adjusted to its intended position by any suitable means.

From the foregoing it is now clear that the orthodontic arch, by virtue of its design and construction is very convenient to remove and replace in a patient's mouth and to adjust as often as may be required during the progress of the treatment.

Variations may be resorted to and parts may be used without others within the scope of the appended claims.

Having now fully described my invention, I claim:

1. An orthodontic arch wire consisting of two arcuate wire members of which one has a hollow socket at one end for receiving the end of the other wire member, part of said socket being split along one side and said part being partly cut through transversely from both sides of said split portion so as to relieve the latter and form two free resilient clamping portions capable of resiliently enveloping the end of the wire inserted into said socket, the latter having the bore therein extending beyond the split portion further into said socket.

2. An orthodontic appliance lock for an arch wire, including a sleeve member mounted upon said arch wire, a lock body adapted to be secured to an anchoring band for a tooth and having a front wall with a seat thereon upon which said arch wire may rest and a rear wall with an aperture therein through which said arch wire is adapted to extend, a recess portion intermediate said front and rear walls for receiving said sleeve, and means partly movable sideways in upon the arch wire for clamping and retaining said arch wire and sleeve in assembled relation with said lock body.

3. An orthodontic appliance lock according to claim 2, having a clamping hook pivoted to the lock body and swingable sideways into a clamping position in upon the arch wire in which the hooked portion overlies said arch wire, and into a free position in which the same projects away from the same for removal.

4. An orthodontic appliance lock according to claim 2, having a clamping hook member pivoted to the bottom of the lock body and swingable sideways about a substantially vertical axis from a position in which said member projects away from the arch wire so as to allow free removal thereof from the lock body, to a locked position in upon said arch wire in which the hooked portion of the member overlies a portion of said arch wire in contact therewith so as to clamp and retain the same in assembled relation with said lock body, and an auxiliary bottom portion beneath the bottom upon the lock body for supporting said clamping member and retaining the same adjacent to the bottom, there being a pivot pin member passing through said bottom, clamping member and auxiliary member beneath the level of the arch wire to serve as the pivot means for said clamping member.

5. An orthodontic appliance arch wire having a shiftable sleeve thereon which is adapted to cooperate with a lock fixed on an anchoring band of a tooth, said sleeve being split along one side so as to virtually form an arcuate and tapered clamping spring surrounding the wire and resiliently retaining its position thereon by friction, said side along the split portion being of smaller thickness than the wall of the sleeve on the other sides thereof, in order to reduce the distance between said arch wire and the anchoring band when said sleeve is assembled with said lock.

6. A split sleeve according to claim 5, which is round but eccentric with respect to the hole therethrough and with said hole located closer to the split portion along the split side than to the opposite side of the sleeve.

7. A split sleeve according to claim 5, which is round and concentric with respect to the hole therethrough but has the split side cut to present a substantially flat side which is split at its thinnest portion throughout the length of the sleeve.

JOHN A. LINDE.